(No Model.) 6 Sheets—Sheet 3.
J. COYNE.
METHOD OF AND APPARATUS FOR MANUFACTURING GAS.
No. 601,432. Patented Mar. 29, 1898.
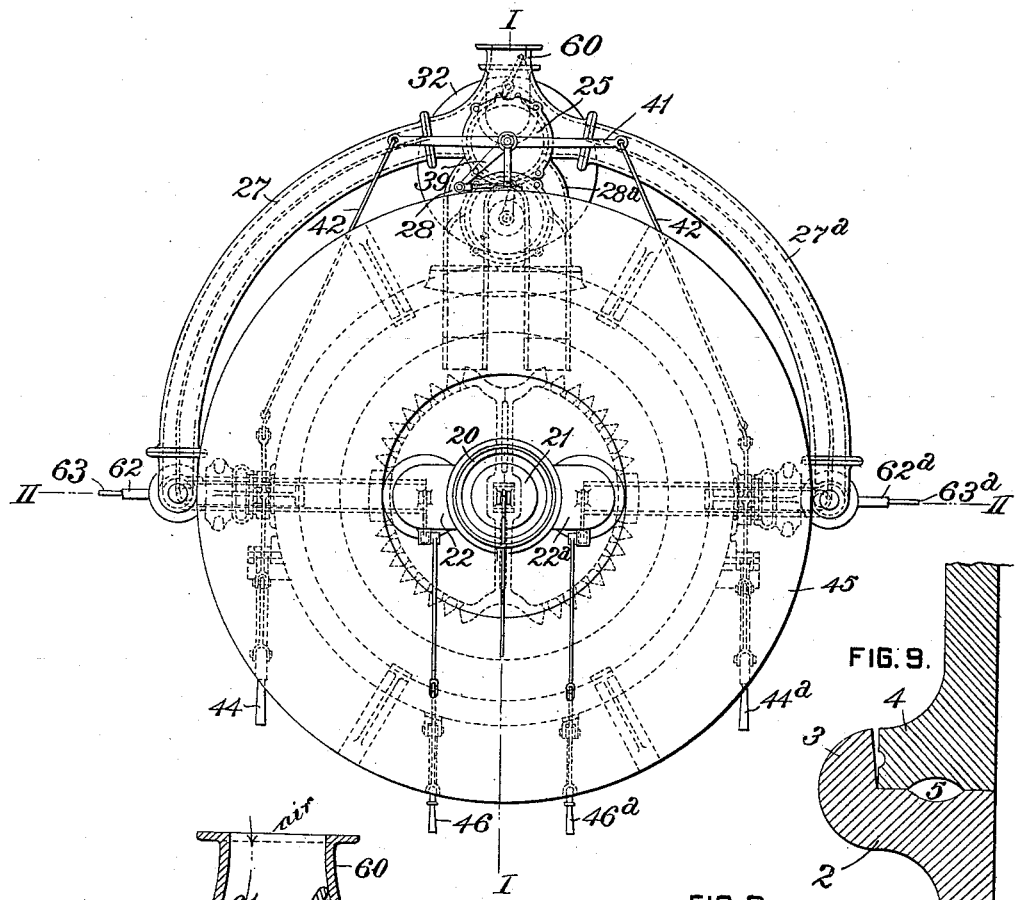
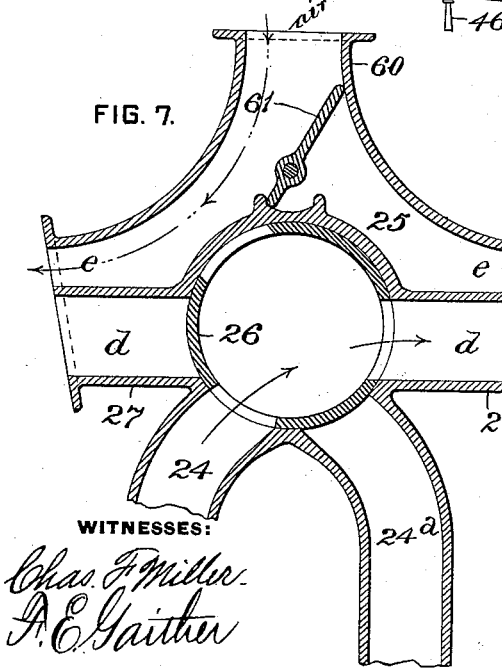
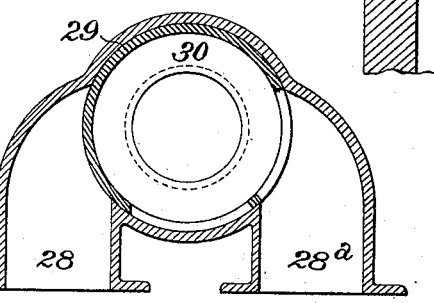
WITNESSES:
Chas. F. Miller
A. E. Gaither
INVENTOR,
John Coyne
by Darwin S. Wolcott
Att'y.

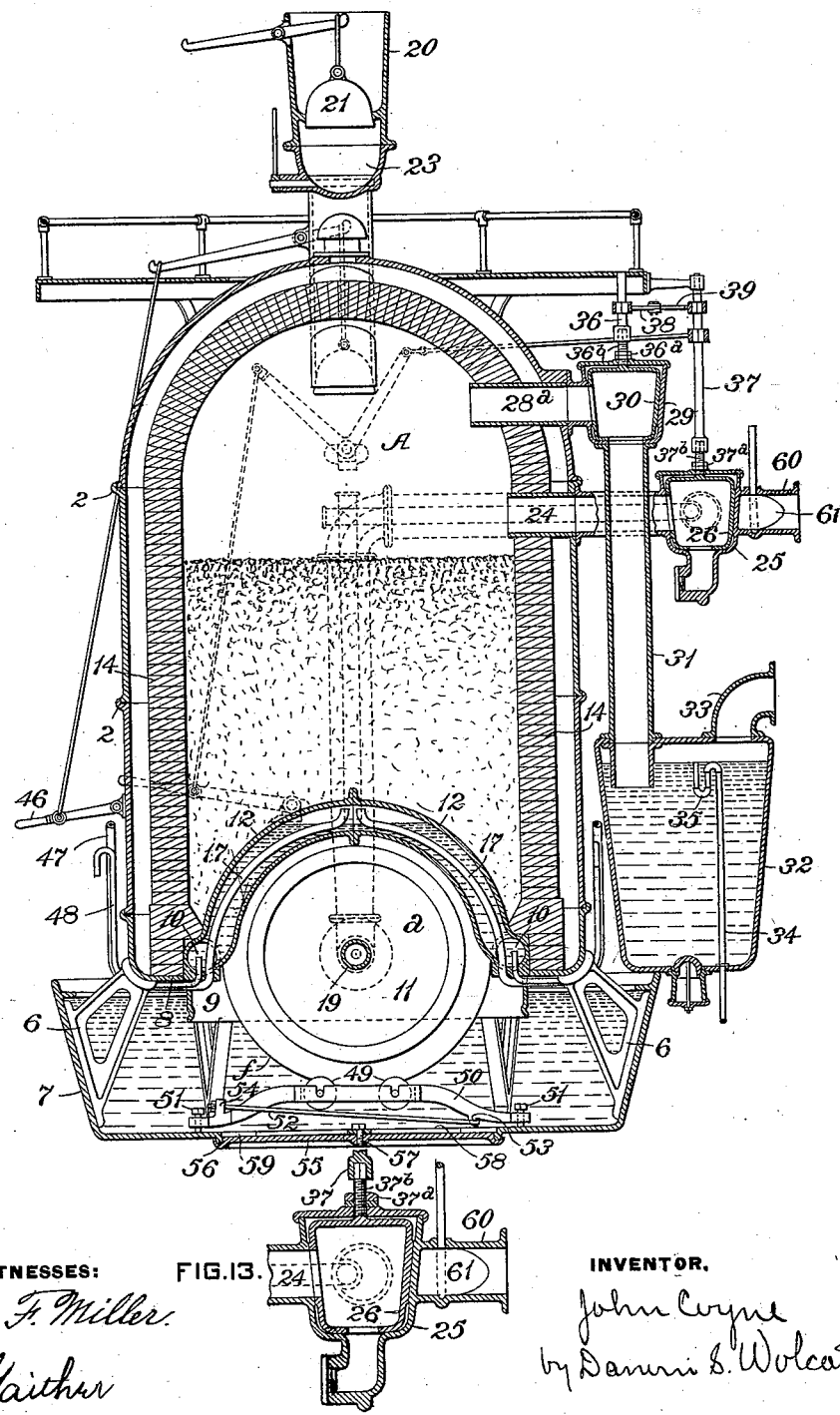

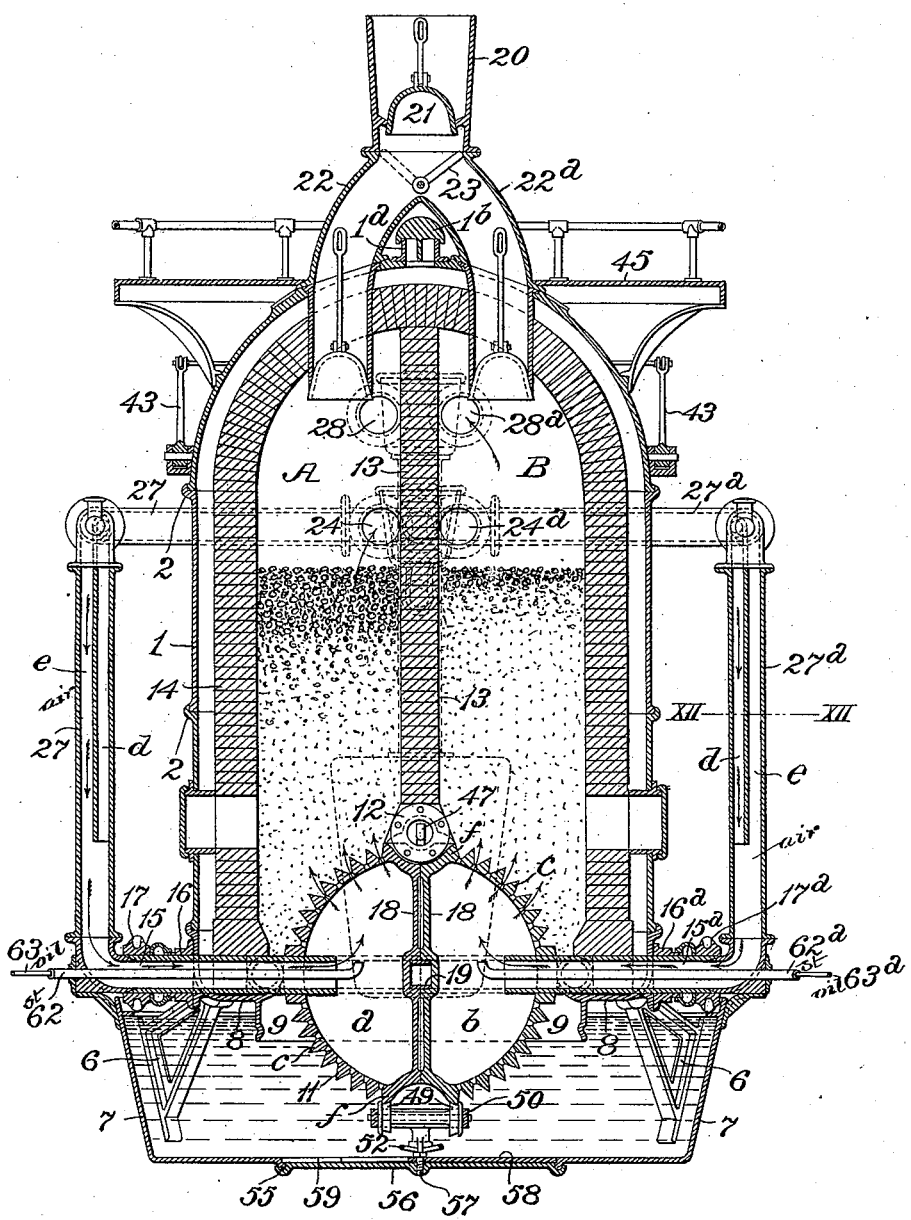

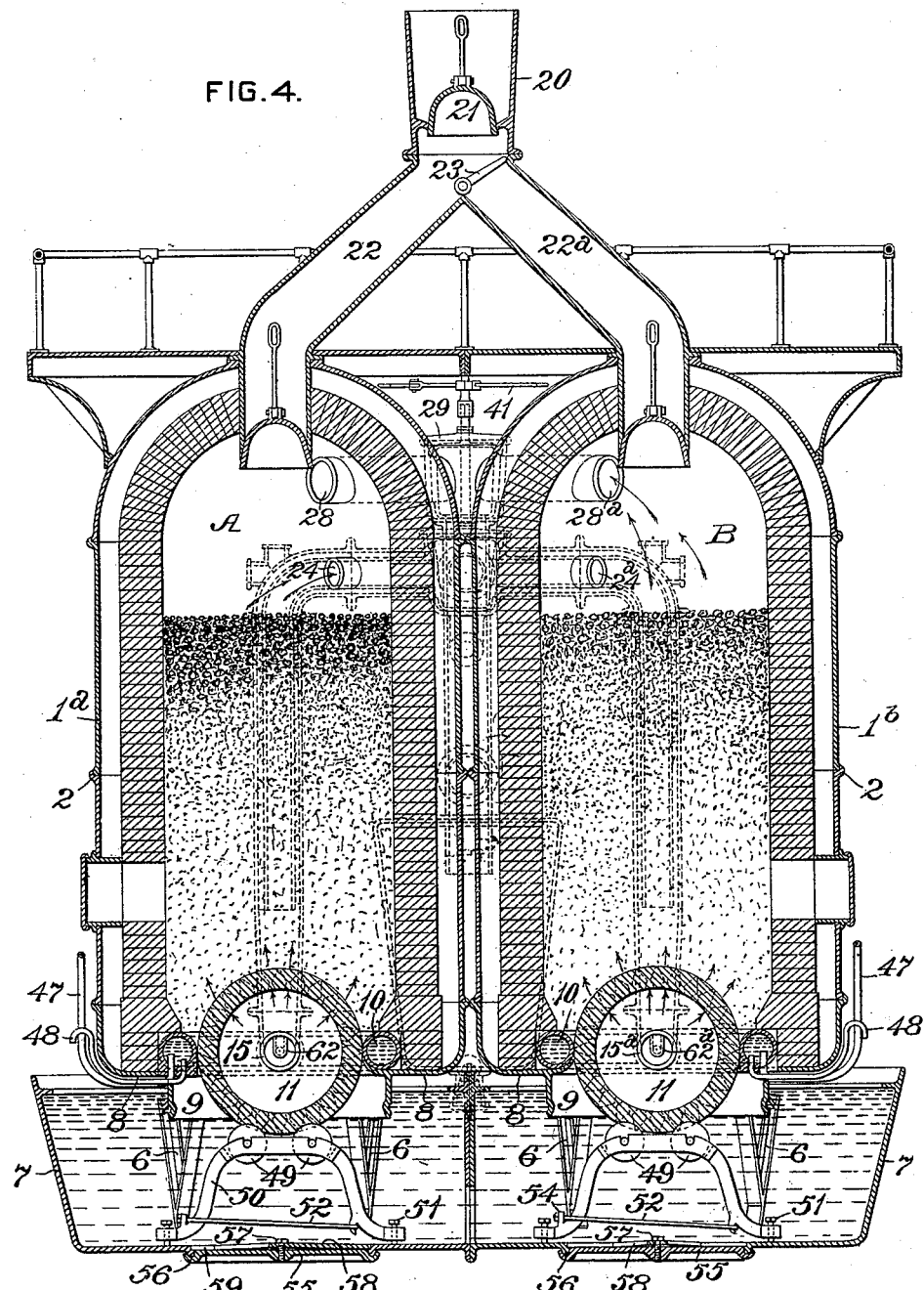

(No Model.)

J. COYNE.
METHOD OF AND APPARATUS FOR MANUFACTURING GAS.

No. 601,432.

Patented Mar. 29, 1898.

FIG. 5.

WITNESSES:
Chas. F. Miller
F. E. Gaither

INVENTOR,
John Coyne
by Daniel S. Wolcott
Att'y.

(No Model.) 6 Sheets—Sheet 6.
J. COYNE.
METHOD OF AND APPARATUS FOR MANUFACTURING GAS.
No. 601,432. Patented Mar. 29, 1898.
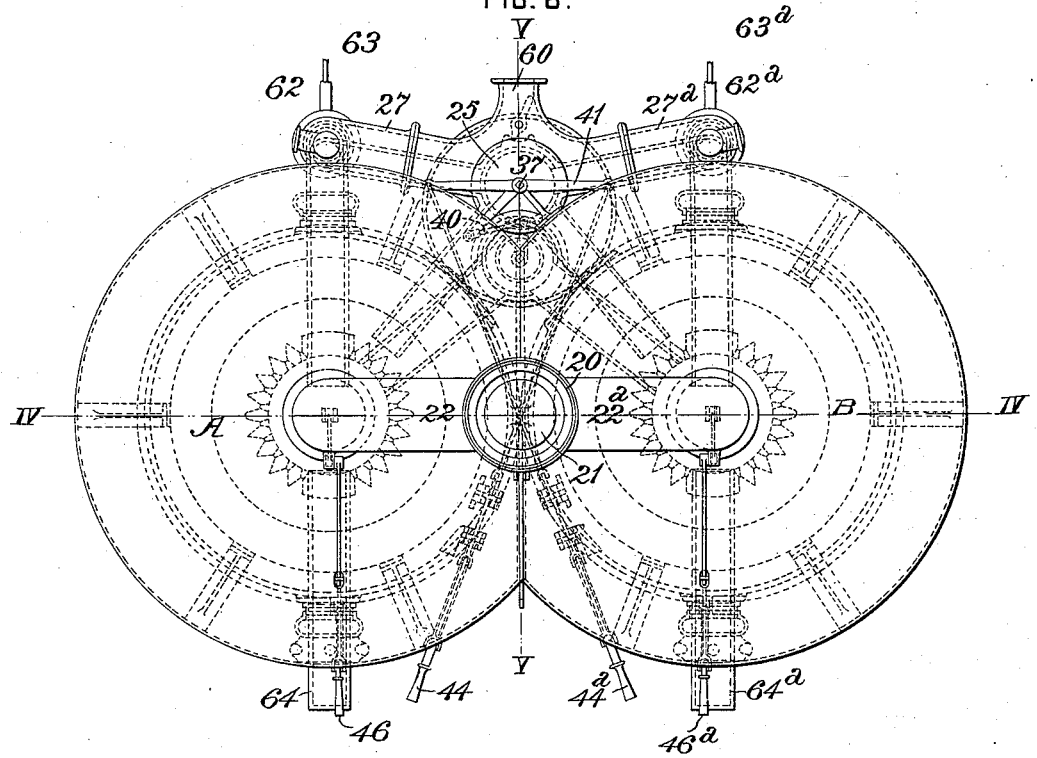
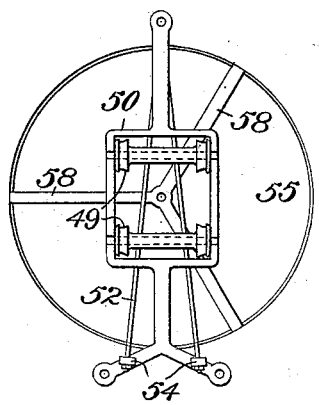
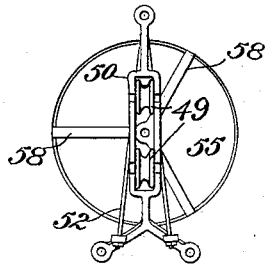
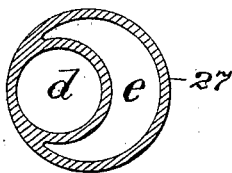
WITNESSES:
Chas. F. Miller.
F. E. Gaither
INVENTOR,
John Coyne
by Dannii S. Wolcott
Att'y.

UNITED STATES PATENT OFFICE.

JOHN COYNE, OF PITTSBURG, PENNSYLVANIA.

METHOD OF AND APPARATUS FOR MANUFACTURING GAS.

SPECIFICATION forming part of Letters Patent No. 601,432, dated March 29, 1898.

Application filed December 2, 1896. Serial No. 614,190. (No model.)

*To all whom it may concern:*

Be it known that I, JOHN COYNE, a citizen of the United States, residing at Pittsburg, in the county of Allegheny and State of Pennsylvania, have invented or discovered certain new and useful Improvements in the Manufacture of Gas, of which improvements the following is a specification.

The invention described herein relates to certain improvements in the method of and apparatus for producing gas rich in illuminating qualities and of such stability as to permit of its being stored and transported for a considerable distance.

In general terms the invention consists in the construction and combination substantially as hereinafter more fully described and claimed.

In the accompanying drawings, forming a part of this specification, Figure 1 is a sectional elevation of my improved plant, the plane of section being indicated at the line I I, Fig. 3. Fig. 2 is a similar view, the plane of section being indicated by the line II II, Fig. 3. Fig. 3 is a top plan view of the apparatus. Fig. 4 is a sectional elevation of a modified form of the apparatus, the plane of section being indicated by the line IV IV, Fig. 6. Fig. 5 is a view, partly in section and partly in elevation, the plane of section being indicated by the line V V, Fig. 6. Fig. 6 is a top plan view of the apparatus shown in Figs. 4 and 5. Figs. 7 and 8 are sectional detail views of the reversing-valves. Fig. 9 is a sectional detail view illustrating the manner of constructing the walls of the metal retaining-shell of the apparatus. Figs. 10 and 11 are detail plan views of the grate-supporting spider. Fig. 12 is a sectional detail view, the plane of section being indicated by the line XII XII, Fig. 2; and Fig. 13 is a sectional detail view, on an enlarged scale, of one of the reversing-valves.

In the practice of my invention I employ two chambers A and B, which are alternately used as generating and fixing chambers. These chambers may be arranged in one retaining-shell 1, as shown in Figs. 1, 2, and 3, or in independent retaining-shells 1$^a$ and 1$^b$, as shown in Figs. 4, 5, and 6. The metal retaining-shells are formed by a series of cylindrical sections and a dome-shaped top or cap section. The upper ends of the body-sections are formed as shown in Fig. 9, with outwardly-projecting flanges or ledges 2, provided around their outer edges with upwardly-projecting retaining ribs or rims 3, thereby forming seats for the reception of the enlargements or feet 4 on the lower ends of the superjacent body-sections or cap. The adjacent faces of the flanges or ledges 2 and the feet 4 are preferably grooved, as shown at 5 in Fig. 9, for the reception of a suitable packing. As an additional safeguard against leakage the outer edges of the feet 4 and the inner faces of the rims 3 are so shaped as to form between them a wedge-shaped opening for the reception of a suitable luting, which is held in place by grooves in the rims or feet. It will be observed that this luting can be tightly packed in position, but will permit the lifting of one section from the others.

The metal shell, which is supported on brackets 6, secured with the tank 7, as shown in Figs. 1, 2, 4, and 5, is provided with an inwardly-projecting shelf or ledge 8. From this ledge or shelf depends the annular apron 9, which projects down sufficiently far into the water contained in the tank to form a seal around the grate, as hereinafter described.

In the construction shown in Figs 1, 2, and 3 two semicircular sections of pipe 10, having a diameter a little greater than the external diameter of the spherical grate 11, are placed on the ledge or shelf 8 and form supports for the arch pipe-sections 12, which are preferably formed integral with the pipe-sections 10 and are formed on arcs of such radius that their upper ends will come into contact with one another and can be secured together, forming the support for the dividing-wall 13.

In the form of apparatus shown in Figs. 4, 5, and 6 the supporting-arch 12 is omitted, as the two chambers are formed in independent shells. The brickwork forming the inner walls 14 is supported by the ledge or shelf 8 and the cooling-pipes 10. It will be observed that an air-space is left between the metallic shell and brickwork to prevent loss of heat or excessive heating of the metallic shell. As gases may escape into the air-space and form an explosive mixture with the air, injury to the shell or brickwork in case of explosion is prevented by the escape-pipe $1^a$, which is normally closed by the weighted cap $1^b$, as shown in Fig. 2.

The hollow spherical grate 11 is supported by the pipes 15 $15^a$, which extend through the outer shell and brickwork and passing between the ends of the pipe-sections 10 project into the grate, as shown in Figs. 2 and 5. These pipes 15 $15^a$ are supported by sleeves $16^a$, which are secured to the outer shell 1. The spherical grate is provided on its surface with conical projections $c$, whereby the portions of the charge adjacent thereto may be agitated, and through the walls of the grate at the bases of the projections are formed conical perforations for the passage of air, gases, &c., into the chambers, said perforations being largest at their inner ends. In order to rotate the grates, collars 17 $17^a$, having sockets for the reception of ends of suitable bars, are secured on the pipes 15 $15^a$, outside of the bearing-sleeves 16.

In the form of apparatus shown in Figs. 1, 2, and 3 the grate is formed in two hemispherical sections $a$ and $b$. In the diaphragms 18, closing these grate-sections, are formed sockets for the reception of the journal 19, which serves to hold the two sections in proper relation to each other.

The fuel is placed in a hopper 20, provided with a controlling-bell 21 and supported by the tubes 22 and $22^a$, which are connected at their upper ends to the hopper 20, while their lower ends project down into the chambers A and B. At the junction of the tubes with the hopper 20 and with each other is arranged a gate 23, whereby the charge may be directed into one or the other tube, as desired.

The chambers A and B are connected by pipes 24 $24^a$ with a valve-chamber 25, having a valve 26 arranged therein. The ports of this valve are so located that in one position of the valve the gases from one chamber will flow through the pipe 24 and the valve into the passage $d$ of the pipe $27^a$, and when the valve is shifted the pipes 24 and $27^a$ will be closed and gases from the other chamber will flow through pipe $24^a$ and the valve into the passage $d$ of pipe 27, as shown in Fig. 7. As shown in Fig. 2, the pipes 27 and $27^a$ are connected at their lower ends to the outer ends of the pipes 15 $15^a$ by a form or construction of joint which will permit of the rotation of the pipes 15 $15^a$ without opening the joint. The joint shown is formed by beveling the outer wall of one set of pipes and the inner wall of the other set of pipes, so as to permit the latter being inserted in the former, as shown. In order to introduce air into the chambers, the pipes 27 $27^a$ are formed with two passages for a portion of their length, and one of these passages $e$ is connected to nozzle 60, which in turn is connected to a suitable source of air under pressure. At the junction of the passages $e$ with the nozzle 60 is placed a gate 61, adapted to direct the air into the passages of the pipes 27 or $27^a$ alternately, and to close the corresponding passage in the other pipe steam is introduced into the chambers A and B by pipes 62 $62^a$, passing through the pipes 15 $15^a$ and projecting into the grates 11, as shown in Figs. 2 and 4. If it is desired to use oil in the production of gas, pipes 63 $63^a$ are passed through or alongside of the steam-pipes 62 $62^a$.

As shown in Figs. 1 and 9, the valve-cases 25 and 29 are internally coned, and the exterior walls of the valves 26 and 30 are similarly shaped, so that the latter may be moved down into the cases to compensate for wear. As these valves might become wedged into the cases and require considerable force to move them, they are preferably supported by means of nuts $36^a$ and $37^a$, screwing on the stems $36^b$ and $37^b$ and bearing on the caps $25^a$ and $29^a$ of the valve-cases. These nuts can be so adjusted that the entire weight of the valves will be borne by them and the valves just in contact with the shells.

The fixed gases are conducted from the chambers by pipes 28 $28^a$, which are connected to the valve-chamber 29, containing the valve 30, and also connected to the pipe 31. The ports of the valve are so arranged that in one position of the valve the pipe 28 is placed in communication with the pipe 31 and by a shifting of the valve the pipe 28 is closed and the pipe $28^a$ connected to the pipe 31. The lower end of the pipe 31 projects down such a distance into the hydraulic main or seal-box 32 that its lower end will be immersed by the water contained in such tank, which is provided with an outlet-elbow 33, adapted to be connected to a pipe leading to a storage-tank or gas-distributing pipes. The seal-box is provided with a supply-pipe and with an escape-pipe 34, having its upper end made in the form of a trap 35. The inflow of water is so regulated that the open end of the trap will be always open, so as to permit of the escape of the heavier gases, as ammonia and cyanogen, through the pipe 35. The water flowing through the pipe 35 will have an ejecting action on the gases, so as to facilitate their escape from the seal-box.

As shown in Figs. 1, 3, and 6, the stems 36 and 37 of the valves 26 and 30 are provided with arms 38 and 39, having their outer ends connected by a link 40, so that a movement of one of the valves will effect a corresponding movement of the other valve. A double arm 41 is secured upon one of the valve-stems, as 37, and the ends of this arm are connected by rods 42 and bell-crank levers 43 to the operating-levers 44 $44^a$, which are so pivoted to the metal shell 1 as to be conveniently operated from the ground, as shown in Figs. 3, 5, and 6. The bell 21 in the hopper 20 and the gate 23 for directing the coal are operated by levers, which are preferably located so as to be convenient of access. The bells in the feed-tubes 22 $22^a$ are connected by suitable mechanism with levers 46 46ª, pivoted to the metallic shell so as to be capable of operation from the ground.

Circulation of water through the pipes 10 and 12 is maintained by the supply-pipes 47 and the outlet-pipes 48, which are arranged to discharge water into the tank 7, as shown in Figs. 1 and 4.

In order to relieve the pipes 15 15ª of a portion of the weight of the grate 11, the latter is provided with one or more circumferential ribs $f$, which rest upon rollers 49, journaled on the frame 50, as shown in Figs. 1, 2, and 5. The legs of this frame are curved upwardly and the feet thereof are provided with adjusting-screws 51, resting on the bottom of the tank, as shown in Figs. 1, 2, 4, 5, 10, and 11, where the height of the frame may be regulated. In order to prevent them from spreading, the legs are tied together by a rod 52, looped around the hook 53 on one leg and its ends passed through lugs 54 on the other legs. The tension of the rod is regulated by nuts screwing on the threaded ends and bearing against the lugs.

For the removal of the grates the bottom of the tank is provided with a removable section 55, which is formed with a peripheral groove for the reception of the rim or bead 56 along the edges of the opening in the bottom of the tank, as shown in Figs. 1, 2, and 4. The removable section is held in place by a bolt 57, passing through the center of the spider 58 and screwing into the section. The ends of the spider rest in a groove 59, formed along the edges of the opening in the bottom of the tank, and in order to prevent displacement of the spider it is given a slight dish or upward curvature, so that when drawn down toward the removable section its ends will be forced outwardly against the wall of the groove 59.

When employing the form of apparatus shown in Figs. 4, 5, and 6, it is preferred to form the tank in two sections, as shown. As each section of the twin apparatus has only one pipe 15 or 15ª, it is preferred to use dummy pipes 64 64ª for supporting the opposite sides of the grates 11, as shown in Figs. 5 and 6, said pipes being closed at their outer or inner ends.

In the manufacture of gas kindling and coke or coal are charged and ignited in both chambers. A blast of air is maintained in both chambers until a body of incandescent fuel of suitable depth is obtained in each chamber. The products of combustion during the preliminary operation are allowed to escape through the charging-tubes 22 22ª and hopper 20. Carbonaceous fuel, as coal, is then charged into one of the chambers, as A, and the bells in the tubes and hopper are closed. Air under pressure is then forced through the passage $e$ of pipe 27 into the hollow grate, whence it escapes in small jets into the chamber A. As the air passes through the incandescent charge it is decomposed. In the lower portion of the charge carbonic acid is formed, but is converted while passing through the upper part of the incandescent bed into carbonic oxid. The heat of the incandescent bed and that of the gases passing through the superincumbent coal volatilizes the hydrocarbons thereof, and the gases thus produced mingle with the carbonic oxid and pass through the pipe 24, the passage $d$ of pipe 27ª, the valve 26 having been properly adjusted, and hollow grate 11, into the chamber B. As the gases begin to flow into the hollow grate of chamber B steam is mingled with the gases in the grate and passes with them into and through the incandescent charge in chamber B. In their passage through the incandescent charge of chamber B the hydrocarbon vapors are fixed and the steam is decomposed, producing oxygen and hydrogen. The carbon is volatilized by the combined action of heat and oxygen and combines with the latter, forming carbonic oxid, while the nitrogen will combine with a portion of the hydrogen, forming ammonia. The gases thus formed and fixed in the chamber B pass by the pipe 28ª through hydraulic main and water seal, where the ammonia and cyanogen gases are removed, and then into a distributing-main or gas-holder. As soon as the charge in chamber B becomes cooled the valves 26 and 30 and gate 61 are reversed and the valve in steam-pipe 62ª is closed and that in 62 is opened. At the same time a charge of coal is admitted into chamber B. It results from this adjustment of the valves that air will flow through passage $e$ of pipe 27ª into the grate of the chamber B, and the gases generated in said chamber will flow through the pipe 24ª, the passage $d$ of pipe 27, into the grate of chamber A, where it is mingled with steam, as above described, and passes in small jets through the incandescent charge in chamber A. From the latter chamber the gases flow through the pipe 28, hydraulic main, and water seal to the distributing-main or gas-holder.

If it is desired to produce a gas of high illuminating quality, oil may be introduced into the fixing-chamber through the pipe 63 or 63ª along with the steam.

It is characteristic of my improved method that all the gases generated are saved, none being lost in the blasting up of the charges, the latter operation as an independent step being entirely avoided in my improved method. It will be noticed that the gases from the generating-chamber and the steam pass upwardly through the incandescent charge of the fixing-chamber, or, in other words, are subjected to a gradually-decreasing temperature, the lower part of the charge in the fixing-chamber being the hottest. This operation results in the production of carbonic oxid, hydrogen, marsh-gas, ethylene, and acetylene, all of which are valuable in heating and illuminating gases.

This operation also facilitates the combination of the nitrogen and hydrogen, forming ammonia, which can be removed.

The methods heretofore in vogue—i. e., passing the gases down through the incandescent fixing-charge—result in the production of carbonic oxid, carbonic-acid gas, and nitrogen, the two latter being in such quantities as to greatly reduce the efficiency of the carbonic oxid. It also results from forcing the air and gases up through the charges that the latter are prevented from packing down into a comparatively dense mass, through which the air and gases can be forced with difficulty.

I claim herein as my invention—

1. As an improvement in the art of manufacturing gas, the method herein described, which consists in passing air upward through an incandescent body of carbonaceous material and a superincumbent charge of fresh fuel ignited from the incandescent body and hot gases passing therethrough, and then commingling the gases so produced with steam or steam and oil, and passing such commingled gases and steam or steam and oil through an incandescent body of carbonaceous material in such manner that the gases will be subjected to a gradually-reduced heat, substantially as set forth.

2. As an improvement in the art of manufacturing gas, the method herein described, which consists in passing air upward through an incandescent body of carbonaceous material and a superincumbent charge of fresh fuel ignited from the incandescent body and hot gases passing therethrough, and then commingling the gases so produced with steam or steam and oil, and passing such commingled gases and steam or steam and oil upward through an incandescent body of carbonaceous material previously blasted from the bottom, substantially as set forth.

3. In a gas apparatus, the combination of two chambers, pipe connections extending from the upper portions of each of said chambers and connected to the lower ends of the other chamber, and pipes for introducing air and steam into the lower portions of each chamber, substantially as set forth.

4. In a gas apparatus, the combination of two chambers, a valve mechanism, pipe connections from the upper and lower portions of each chamber to the valve mechanism, and pipes for introducing air and steam into the lower portions of said chambers, substantially as set forth.

5. In a gas apparatus, the combination of a water-tank provided with inwardly-projecting brackets, a metallic shell supported by said brackets and provided with an inwardly-projecting ledge or shelf for supporting the lining, an annular apron projecting from the shell down into the water contained in the tank, and a grate arranged in the space inclosed by the annular apron, substantially as set forth.

6. In a gas apparatus, the combination of a metallic shell provided with an inwardly-projecting shelf or ledge for supporting the lining, semicircular water-pipes supported by the ledge, and a pipe for supplying water to the semicircular pipes, substantially as set forth.

7. In a gas apparatus, the combination of a chamber, a hollow, spherical grate with conical projections on its exterior and conical openings to the interior, and provided with a circumferential rib adjustably supported, rollers forming a bearing or support for the rib, and one or more blast-pipes for rotating the grate, substantially as set forth.

8. In a gas apparatus, the combination of a tank, a generator-shell supported within the tank, with its lower end projecting below the surface of the water contained in the tank, a grate arranged in the lower end of the generator, a frame resting on the bottom of the tank, and a removable plate forming a portion of the bottom of the tank, substantially as set forth.

9. In a gas apparatus, the combination of a tank, a generator-shell supported within the tank, a hollow, spherical grate provided with projections on its outer surface, and having its walls perforated, a frame for adjustably supporting the grate and a pipe extending into the grate and adapted to rotate the same, substantially as set forth.

10. In a gas apparatus, the combination of two chambers and pipes projecting in the lower portions of said chambers, the pipe from each chamber being connected to the upper portion of the other chamber, and pipes connected to a suitable source of air under pressure and to the lower portions of the chamber, substantially as set forth.

In testimony whereof I have hereunto set my hand.

JOHN COYNE.

Witnesses:
DARWIN S. WOLCOTT,
F. E. GAITHER.